United States Patent
Green

(10) Patent No.: US 7,384,069 B2
(45) Date of Patent: Jun. 10, 2008

(54) STEERING RACK MOUNTING PRELOAD

(75) Inventor: Steve J. Green, Clarkston, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 319 days.

(21) Appl. No.: 11/199,651

(22) Filed: Aug. 9, 2005

(65) Prior Publication Data

US 2007/0035117 A1   Feb. 15, 2007

(51) Int. Cl.
  *B62D 1/18*   (2006.01)
(52) U.S. Cl. ...................................................... 280/775
(58) Field of Classification Search ................ 280/775, 280/779, 93.51, 93.513, 93.514; 74/493
  See application file for complete search history.

(56) References Cited

U.S. PATENT DOCUMENTS

| | | | |
|---|---|---|---|
| 3,333,513 A | 8/1967 | Wettstein | |
| 3,958,462 A | 5/1976 | Matschinsky et al. | |
| 4,540,059 A | 9/1985 | Shibahata et al. | |
| 4,546,839 A | 10/1985 | Noguchi | |
| 4,566,710 A * | 1/1986 | Furukawa et al. | 180/410 |
| 4,823,898 A | 4/1989 | Ogura et al. | |
| 4,828,063 A * | 5/1989 | Ogura et al. | 180/400 |

FOREIGN PATENT DOCUMENTS

| | | |
|---|---|---|
| DE | 10003936 | 8/2001 |
| EP | 0150303 | 8/1985 |

* cited by examiner

*Primary Examiner*—Faye M. Fleming
(74) *Attorney, Agent, or Firm*—MacMillan, Sobanski & Todd, LLC

(57) ABSTRACT

A steering system of a vehicle is provided that includes a steering gear assembly including a tubular housing coupled to the vehicle. A pre-load compliant mounting bracket is coupled to the tubular housing and mounted to the vehicle for laterally placing the steering gear assembly into a pre-loaded state. A compliant mounting bracket is coupled to the tubular housing and mounted to the vehicle for limiting the steering gear assembly from laterally displacing relative to the vehicle beyond a predetermined distance. The pre-load compliant mounting bracket is compliant to the lateral displacement of the steering gear assembly for producing an understeer condition when a steering force above a predetermined steering force threshold is applied to the vehicle and is non-compliant when a steering force below the predetermined steering force threshold is applied to the vehicle.

20 Claims, 2 Drawing Sheets

STEERING RACK MOUNTING PRELOAD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to steering systems, and in particular, to a compliant steering gear assembly.

2. Description of the Related Art

Steering systems in motor vehicles typically comprise rack and pinion steering systems. The rack and pinion steering systems consist of a pinion shaft, pinion teeth, a rack including rack teeth, and a housing. The housing houses a hydraulic valve section, an extended rack section, and houses the meshing of the pinion teeth and the rack teeth. The housing is commonly supported by one or more mounting brackets. The mounting brackets are secured to the housing and are bolted to a vehicle frame or a unibody structure. Rubber grommets or bushings disposed between the mounting bracket and the vehicle frame are typically used to dampen noise and vibrations from the road.

The mounting brackets typically are either rigid to prevent movement of the steering gear assembly relative to the vehicle frame or resilient to accommodate movement of the steering gear assembly relative to the vehicle frame. Typically when a vehicle is cornering at low lateral acceleration forces, it is desirable to have the steering gear assembly rigid so that the steerable gears are immediately responsive to the driver's demands. At increased lateral acceleration forces, lateral movement of the steering gear assembly (i.e., a resilient mounting of the steering gear relative to the vehicle frame) is desirable in order to create an understeer condition. That is, when lateral movement of the steering gear assembly occurs, the steering wheel must be rotated an additional number of degrees before the driver's intended steering affect is produced. The steering system will respond with a smaller steering angle than if the steering gear assembly were rigidly mounted to the vehicle. The understeer condition is more desirable as the vehicle approaches adhesion limits than an oversteer condition at the adhesion limits.

Thus, it is desirable to have a steering system which maintains a rigidly mounted steering gear assembly when low lateral acceleration forces are exerted on the vehicle and changes to a compliant steering gear assembly when high lateral acceleration forces are exerted on the vehicle.

BRIEF SUMMARY OF THE INVENTION

The present invention has the advantage of providing a rigid steering system which is immediately responsive to steering and guidance inputs as intended by the driver of a vehicle when lateral acceleration forces exerted on the vehicle are below a predetermined threshold and providing a compliant steering system when lateral acceleration forces exerted on the vehicle are greater than the predetermined threshold.

In one aspect of the invention, a steering system of a vehicle is provided that includes a steering gear assembly including a tubular housing coupled to the vehicle. A pre-load compliant mounting bracket is coupled to the tubular housing and mounted to the vehicle for laterally placing the steering gear assembly into a pre-loaded state. A compliant mounting bracket is coupled to the tubular housing and mounted to the vehicle for limiting the steering gear assembly from laterally displacing relative to the vehicle beyond a predetermined distance. The pre-load compliant mounting bracket is compliant to the lateral displacement of the steering gear assembly for producing an understeer condition when a steering force above a predetermined steering force threshold is applied to the vehicle and is non-compliant when a steering force below the predetermined steering force threshold is applied to the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
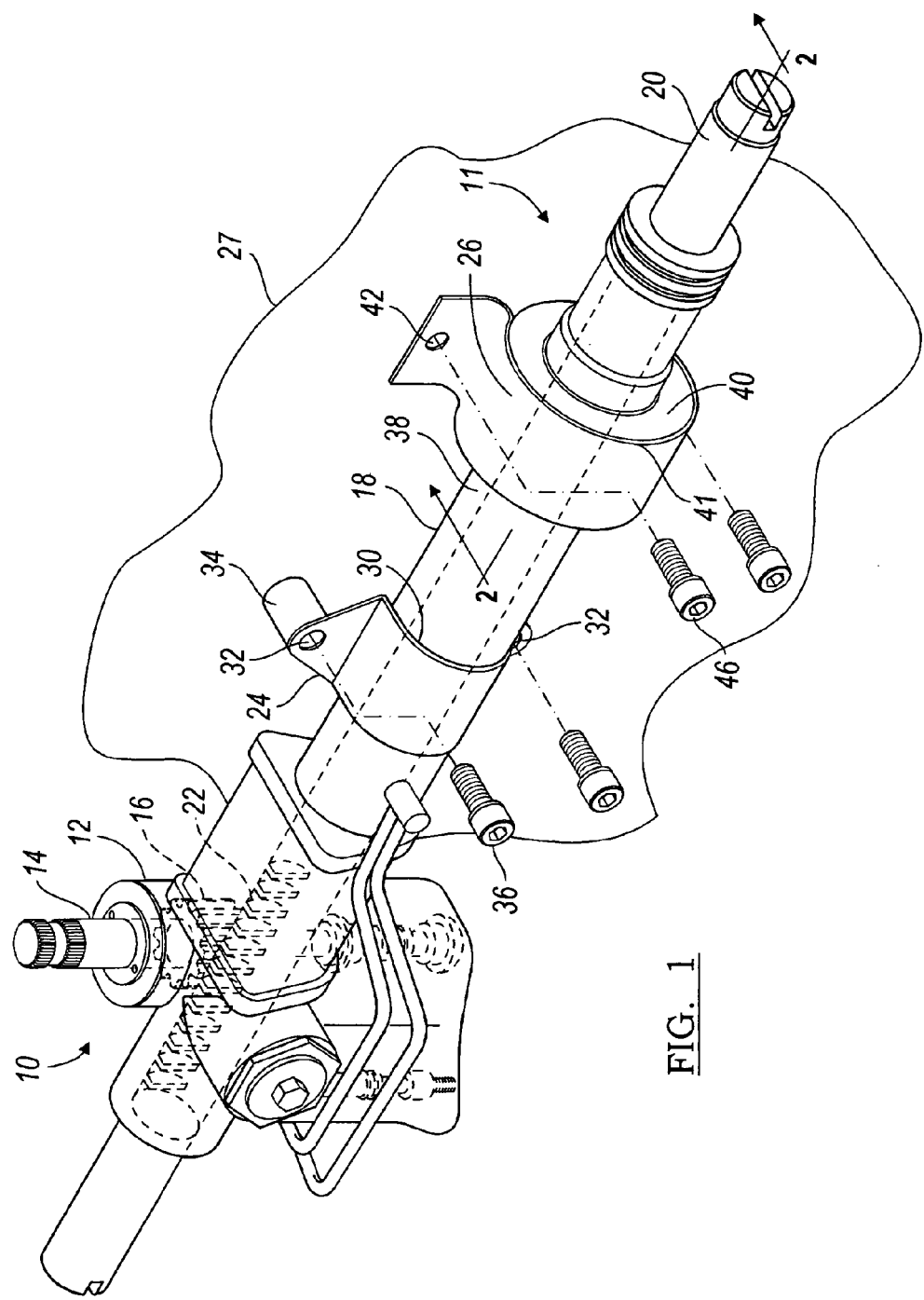
FIG. 1 is a perspective view of a tube and bracket assembly for a rack and pinion steering system of a vehicle according to a first preferred embodiment of the present invention.

FIG. 1 shows a steering gear assembly 10 for a rack and pinion steering system, indicated generally at 11, mounted to a frame 27 of a vehicle. The rack and pinion steering system may be an electrical, hydraulic or a manual steering system. The steering gear assembly 10 includes a pinion gear housing 12 that houses an input shaft 14. A first end of the input shaft 14 is coupled to a steering wheel (not shown) through conventional steering linkages (not shown) and receives rotational input from a driver of the vehicle. The input shaft 14 has a pinion gear 16 formed on a second end of the shaft 14.

The steering gear assembly 10 further includes a tubular housing 18 that houses a rack 20. The rack 20 includes rack gear teeth 22 that mesh with the pinion gear 16 within the pinion gear housing 12 for laterally displacing the rack 20 when the input shaft 14 is rotated. The opposite ends of the rack 20 each include a ball and socket joint (not shown) for pivotably connecting tie rods (not shown) to the rack 20. The tie rods are connected to steerable wheels (not shown) for steering the vehicle via the driver's manual input commands to the steering wheel.

The steering gear assembly 10 includes a compliant mounting bracket 24 and a pre-load compliant mounting bracket 26 for securing the steering gear assembly 10 to a portion of the vehicle frame 27, which may be a frame a cross member or a portion of a unibody structure. Preferably, the compliant mounting bracket 24 includes a semi-circular portion 30 for receiving the tubular housing 18 and apertures 32 for receiving fastening members 36 for mounting the tubular housing 18 to the vehicle frame 27. Alternatively, the compliant mounting bracket 24 may utilize shapes other than semi-circular.

Rubber mounting grommets 34 are disposed between the compliant mounting bracket 24 and the vehicle frame 27 at the locations of the apertures 32. The rubber grommets 34 allow lateral movement of the steering gear assembly 10 relative to the vehicle frame 27. The rubber grommets 34 have a predetermined modulus of elasticity that will allow them to elastically deform to an extent that the steering gear assembly 10 can move laterally to a predetermined maximum distance. In alternative embodiments, the rubber grommets 34 are produced from an alternative material which still allows the steering gear assembly 10 to laterally move this predetermined maximum distance when fastened to the vehicle frame 27. Other mounting methods may be used to attach the compliant mounting bracket 24 to the vehicle frame including using spike mounts (i.e., studs) that are integrally formed or affixed to the attaching vehicle member. The spike mounts extend through apertures are securely fastened by a nut or similar fastening device. Various types of attachments in addition to those described herein may be utilized to attach the compliant mounting bracket to the vehicle without deviating from the scope of the invention.

The pre-load compliant mounting bracket 26 includes a spring-like bushing 40 that is contoured to an exterior surface 38 of the tubular housing 18. In the preferred embodiment, the spring-like bushing 40 has a generally cylindrical shape and is preferably made of a resilient material such as rubber which provides a predetermined spring rate. Alternatively, other shapes may be utilized in addition to other suitable resilient materials utilized in place of rubber such as metal or plastics. A corresponding cylindrical plate 41 is formed about an outer cylindrical surface 50 of the bushing 40 for encasing all or at least a portion of the bushing 40. The cylindrical plate 41 includes apertures 42 for receiving fastening members 46 that secure the cylindrical plate 41 around the bushing 40 and to the vehicle frame 27. The cylindrical plate 41 is preferably made of metal, although other materials such as plastic or composites may be utilized.

Figure 2:
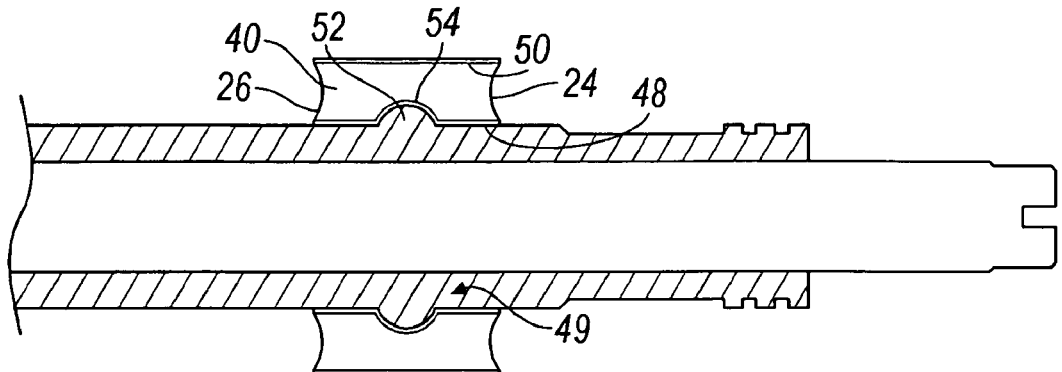
FIG. 2 is a cross section, taken along line 2-2 in FIG. 1, of a pre-load compliant mounting bracket and tubular housing.

The pre-load compliant mounting bracket 26 and tubular housing 18 cooperatively form a latch system 49 (shown in FIG. 2). FIG. 2 shows a cross section of the pre-load compliant mounting bracket 26 and the tubular housing 18 illustrating the latch system 49 according to the first preferred embodiment. The bushing 40 of the pre-load compliant mounting bracket 26 includes an inner generally cylindrical surface 48 and the outer circumference surface 50. The inner surface 48 receives and conforms to the exterior surface 38 of the tubular housing 18.

The tubular housing 18 includes a detent 52 integrally formed on the exterior surface 38 of the tubular housing 18. In this embodiment, the detent 52 is a raised surface area that extends circumferentially about the tubular housing 18. Alternatively, the raised surface may include individual bumped surface areas as opposed to a continuous raised surface area. In addition, the detent 52 may be separately formed from the tubular housing 18 and may thereafter be welded, press-fit, or attached to the tubular housing 18 by other means.

The bushing 40 includes a recessed portion 54 that extends circumferentially about the inner surface 48 of the bushing 40. The recessed portion 54 mates, in a complementary fashion, with the detent 52. The detent 52 and recessed portion 54 form the latch system 49, which maintains alignment between the pre-load compliant mounting bracket 26 and the tubular housing 18 until a steering force exerted on the vehicle (i.e., steering gear assembly 10) reaches a predetermined limit.

Referring now to FIGS. 1 and 2, as lateral acceleration forces are exerted on a vehicle, for example, when the vehicle is cornering, steering loads are reacted by the steering gear system 10. As the vehicle corners at high speeds, it is advantageous for the vehicle to be in an understeer condition. To achieve this understeer condition when high lateral acceleration forces are exerted on the vehicle, the steering rack system 10 is allowed to move laterally relative to the frame 27. This is achieved by the interaction between the detent 52 of the tubular housing 18 and the recessed portion 54 of the pre-load compliance mount 26.

For an understeer condition where the steering force exerted on the steering gear system 10 is less than a predetermined threshold, the detent 52 is held rigid within the recessed portion 54. The stiffness of the bushing 40, along with the size and shape of the detent 52 and recess portion 54, assures that the detent 52 is held rigid within the recessed portion 54 below this steering force threshold. This maintains a rigid steering system. That is, the steering affect which is desired and expected by the driver is immediately executed by the steering system since the steering rack system 10 is held rigid relative to the frame 27.

For a vehicle condition where the steering force exerted on the vehicle is greater than a predetermined threshold, the steering force exerted on the steering gear assembly 10 overcomes holding force of the latch system 49 and forces the detent 52 to move out of alignment with the recessed portion 54. The steering wheel now has to rotate a greater number of degrees before the driver is provided with the steering affect intended, thus creating an understeer condition of the vehicle. As stated earlier, for a vehicle having zero or low steering forces (less than the predetermined threshold) exerted on the vehicle, a non-compliant steering system is maintained. Non-compliant used herein refers to a rigid steering system or at least a reduced compliant steering system where some lateral movement is allowed for reducing factors such as NVH. Under high steering forces (higher than the predetermined threshold), a compliant steering system is maintained.

The compliant mounting bracket 24 compliments the pre-load compliant mounting bracket 26 by preventing the steering gear assembly 10 from moving more than a predetermined distance relative to the frame 27. The limits of the predetermined length that the steering gear assembly 10 may laterally move are based on the modulus of elasticity of the compliant mounting bracket 24. Changing the properties of the material (i.e., hardness) will change the elasticity of the compliant mounting bracket 24.

Figure 3:
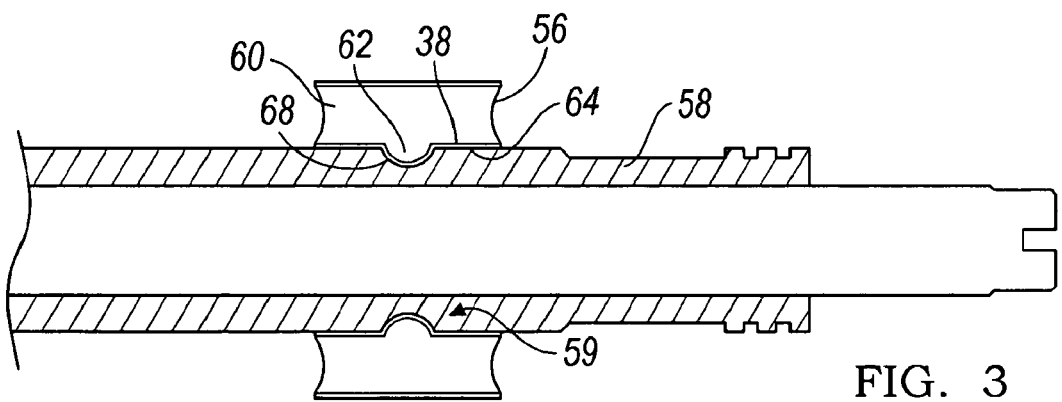
FIG. 3 is a cross section of a pre-load compliant mounting bracket and tubular housing similar to FIG. 2, but illustrating a second preferred embodiment of the present invention.

FIG. 3 shows a cross section of a pre-load compliant mounting bracket 56 and the tubular housing 58 illustrating a latch system 59 according to a second preferred embodiment. The pre-load compliant mounting bracket 56 includes a bushing 60 having a detent 62 integrally formed and extending from the inner surface 64 of the bushing 60. Alternatively, the detent may be formed separately and affixed to the pre-load compliant mounting bracket 56. The detent 62 is a raised surface area that extends circumferentially about the inner surface 64 of the bushing 60. Alternatively, the raised surface may include individual bumped surface areas as opposed to a continuous raised surface area.

The tubular housing 58 includes a recessed portion 68 that extends circumferentially about the exterior surface 38 of the tubular housing 58. The recessed portion 68 mates, in a complementary fashion, with the detent 62. The detent 62 and the recessed portion 68 form a latch system 59 which, like the first embodiment, maintains alignment between the pre-load compliant mounting bracket 56 and the tubular housing 58 until a steering force exerted on the steering gear system 10 reaches a predetermined threshold.

When the lateral acceleration force exerted on the vehicle results in steering forces reaching a predetermined threshold, the bushing 60 deforms to allow the detent 62 of the bushing 60 to move laterally out of the recessed portion 68 of the tubular housing 58. The understeer condition is produced in response to the detent 62 unlatching from the recessed portion 68.

Figure 4:
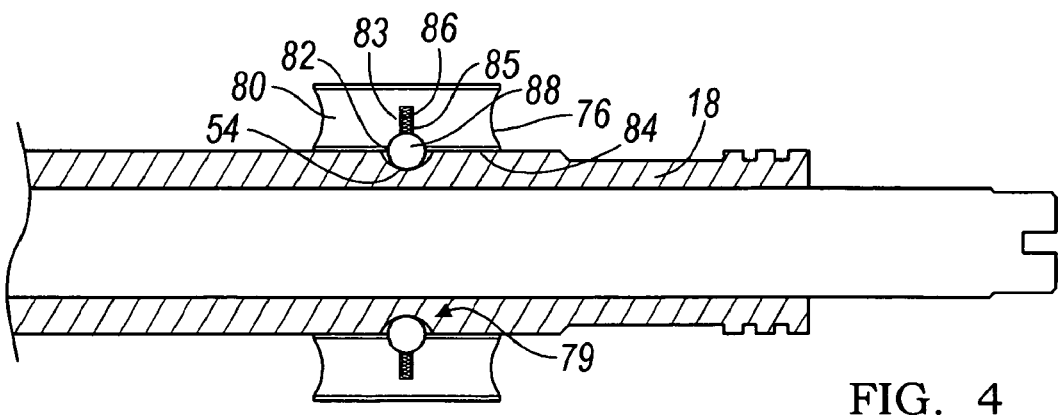
FIG. 4 is a cross section of a pre-load compliant mounting bracket and tubular housing similar to FIG. 2, but illustrating a third preferred embodiment of the present invention.

FIG. 4 shows a cross-section of the pre-load compliant mounting bracket 70 and the tubular housing 18 illustrating a latch system 79 according to a third preferred embodiment. The tubular housing 18 is similar to that discussed in FIG. 2. The pre-loaded compliance mount 76 includes a bushing 80 having a detent 82. The detent 82 includes at least one bore 83 formed in the inner surface wall 84 of the bushing 80. A spring and ball assembly 85 having a predetermined spring-rate is disposed in the bore 83. When the spring and ball assembly 85 and the recess portion 54 are aligned, the spring force seats a ball 88 within the recessed portion 54. When the lateral acceleration forces exerted on the vehicle results steering forces greater than the predetermined threshold, the spring force of the spring and ball assembly 85 is overcome, the spring 86 compresses thereby unlatching the ball 88 from the recessed portion 54. The understeer condition is produced in response to the detent 82 unlatching from the recessed portion 54.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A steering system of a vehicle comprising:
a steering gear assembly including a tubular housing coupled to said vehicle;
a pre-load compliant mounting bracket coupled to said tubular housing and mounted to said vehicle for laterally placing said steering gear assembly into a pre-loaded state; and
a compliant mounting bracket coupled to said tubular housing and mounted to said vehicle for limiting said steering gear assembly from laterally displacing relative to the vehicle beyond a predetermined distance;
wherein said pre-load compliant mounting bracket is compliant to said lateral displacement of said steering gear assembly for producing an understeer condition when a steering force above a predetermined steering force threshold is applied to said vehicle and is non-compliant when said steering force below said predetermined steering force threshold is applied to said vehicle.

2. The system of claim 1 further comprising a latch system operatively engaging said tubular housing and said pre-load compliant mounting bracket for maintaining said pre-loaded state of said steering gear assembly when mounted to said vehicle.

3. The system of claim 2 wherein said latch system includes a detent extending from one of the tubular housing and the pre-load compliant mounting bracket, and a recessed portion located in the other of the tubular housing and the pre-load compliant mounting bracket and engaged with the detent for maintaining said pre-loaded state of said steering gear assembly as said pre-load compliant mounting bracket is mounted to said vehicle.

4. The system of claim 3 wherein said tubular housing includes said detent and said pre-load compliant mounting bracket includes said recessed portion.

5. The system of claim 3 wherein said tubular housing includes said recessed portion and said pre-load compliant mounting bracket includes said detent.

6. The system of claim 3 wherein said detent is a raised surface area.

7. The system of claim 6 wherein said raised surface area extends circumferentially about said tubular housing.

8. The system of claim 3 wherein said detent is a spring and ball assembly.

9. The system of claim 1 wherein said pre-load compliant mounting bracket includes a bushing in contact with said tubular housing, said bushing having a predetermined spring-rate.

10. The system of claim 9 wherein said bushing is a resilient material.

11. The system of claim 10 further comprising a cylindrical plate substantially surrounding said bushing.

12. The system of claim 9 wherein said cylindrical plate is metal.

13. The system of claim 9 wherein said cylindrical plate is plastic.

14. The system of claim 9 wherein said cylindrical plate is a composite material.

15. The system of claim 1 wherein said compliant mounting bracket includes bushings mounted to said vehicle, wherein said bushings prevent lateral movement of said steering gear assembly beyond said predetermined distance.

16. A method for pre-loading a steering gear assembly in a vehicle for producing an understeer condition, the method comprising the steps of:
providing said steering gear assembly with a tubular housing that is coupled to a compliant mounting bracket and a pre-load compliant mounting bracket;
mounting said compliant mount bracket to said vehicle;
operatively engaging said compliant mounting bracket to limit said steering gear assembly from laterally displacing relative to the vehicle beyond a predetermined distance when a steering gear force is exerted on said vehicle; and
placing said steering gear assembly into a pre-loaded state by mounting said pre-load compliant mounting bracket to said vehicle, wherein said pre-load compliant mounting bracket is compliant to said lateral displacement of said steering gear assembly for producing said understeer condition when said steering force exerted on said vehicle is greater than a predetermined steering force threshold and is non-compliant to said lateral displacement when said steering force exerted on said vehicle is less than said predetermined steering threshold.

17. A steering system of a vehicle comprising:
a steering gear assembly including a tubular housing coupled to said vehicle;

a pre-load compliant mounting bracket coupled to said tubular housing and mounted to said vehicle for laterally placing said steering gear assembly into a pre-loaded state;

a latch system operatively engaging said tubular housing and said pre-load compliant mounting bracket for maintaining said pre-loaded state of said steering gear assembly when mounted to said vehicle; and a compliant mounting bracket coupled to said tubular housing and mounted to said vehicle for limiting said steering gear assembly from laterally displacing relative to the vehicle beyond a predetermined distance;

wherein said pre-load compliant mounting bracket is compliant to said lateral displacement of said steering gear assembly for producing an understeer condition when a steering force above a predetermined steering force threshold is applied to said vehicle and is non-compliant when said steering force below said predetermined steering force threshold is applied to said vehicle.

18. The system of claim 17 wherein said latch system includes a detent extending from one of the tubular housing and the pre-load compliant mounting bracket, and a recessed portion located in the other of the tubular housing and the pre-load compliant mounting bracket and engaged with the detent for maintaining said pre-loaded state of said steering gear assembly as said pre-load compliant mounting bracket is mounted to said vehicle.

19. The system of claim 17 wherein said pre-load compliant mounting bracket includes a bushing in contact with said tubular housing, said bushing having a predetermined spring-rate.

20. The system of claim 17 wherein said compliant mounting bracket includes bushings mounted to said vehicle, wherein said bushings prevent lateral movement of said steering gear assembly beyond said predetermined distance.

* * * * *